3,306,761
CONTROLLED PARTIAL OXIDATION OF CARBON BLACK WITH AMMONIUM NITRATE, PREFERABLY IN THE PRESENCE OF AMMONIUM, ALKALI METAL, AND ALKALINE EARTH METAL HALIDES
Marvin M. Johnson, Burlington, Mass., assignor to Phillips Petroleum Company, a corporation of Delaware
Filed Apr. 26, 1963, Ser. No. 275,853
14 Claims. (Cl. 106—307)

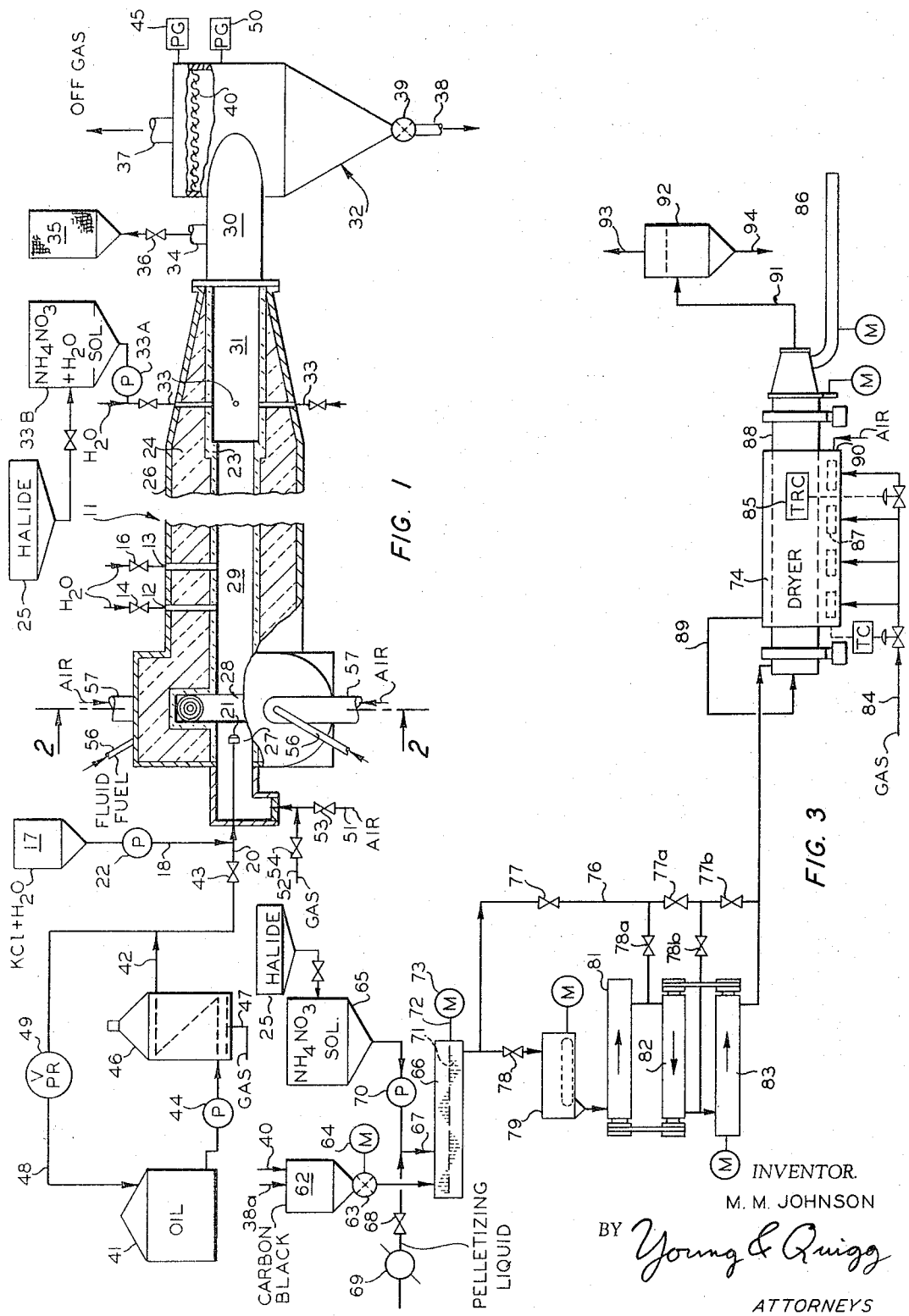

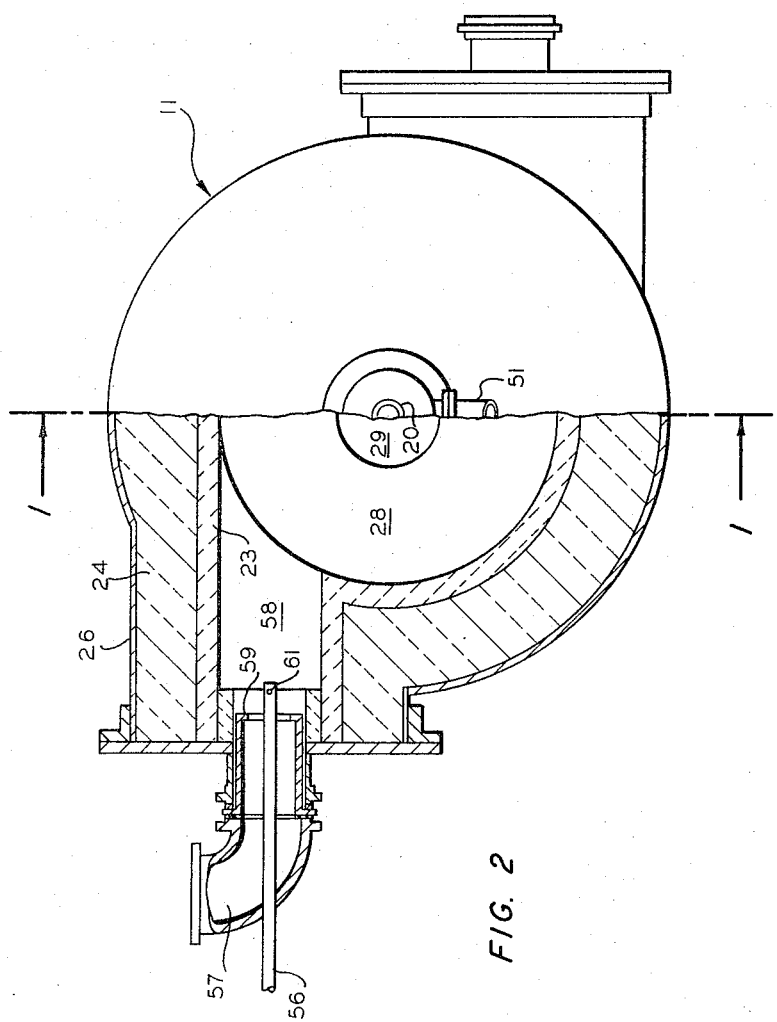

This invention relates to an improved process for increasing the oxygen content of carbon black. In another aspect it relates to an improved process for decreasing the pH of carbon black. In another aspect it relates to an improved process for varying the properties of furnace process carbon black to permit its substitution for channel process carbon black. In another aspect it relates to the controlled partial oxidation of carbon black by heating the same with ammonium nitrate in minor nonexplosive proportions, with or without the presence of ammonium halides, alkali metal halides, or alkaline earth metal halides in small amounts effective to increase the degree of oxidation of the carbon black. In another aspect it relates to the controlled partial oxidation of carbon black produced by thermal decomposition of hydrocarbons in a carbon formation reaction zone while conditions of free carbon formation are maintained therein and simultaneously an alkali metal of atomic number of at least 19 is present in said zone in an amount between 2 and 10,000 parts by weight of alkali metal per million parts by weight of carbon black produced, said oxidation being controlled partial oxidation of said produced carbon black by heating the same with ammonium nitrate in minor nonexplosive proportions, with or without the presence of ammonium halides, alkali metal halides, or alkaline earth metal halides in small amounts effective to increase the degree of oxidation of the carbon black.

In the prior art it is known, in U.S. Patent 2,703,528 of March 8, 1955, to Lee and Akre, that a mixture of 1 to 12 percent carbon black with 99 to 88 percent ammonium nitrate is very explosive, and one would naturally assume that all other proportions would be explosive or subject to uncontrolled burning. However, I have found that a controlled oxidation of carbon black can be successfully carried out to produce improved and desirable qualities in the partially-oxidized carbon black product by mixing the original carbon black with nonexplosive proportions, preferably from 1 to 25 and more preferably from 5 to 10 weight percent, based on the carbon black, of ammonium nitrate and heating the mixture to about 155 to 400° C. and preferably from 175 to 250° C. for a period of time sufficient to complete the decomposition and volatilization of the ammonium nitrate and preferably from 0.01 minute to 24 hours, and more preferably from ½ to 6 hours. In addition, I have found that the process of the preceding sentence is made more efficient by carrying out the heating step in the presence of a small amount sufficient to increase the degree of oxidation of said carbon black of ammonium halides, alkali metal halides, or alkaline earth metal halides, preferably in amounts from 0.01 to 5 percent by weight based on the weight of the carbon black, and more preferably from 0.5 to 3 percent by weight of the carbon black. In addition, I have found that the processes of the preceding two sentences are more desirable when the carbon black has been made by the process of Friauf et al., U.S. Patent 3,010,794 of November 28, 1961, especially when potassium compounds such as potassium chloride have been used to furnish the 2 to 10,000 parts by weight of alkali metal present in the carbon black-forming reaction zone per million parts by weight of carbon black produced.

It has recently become economically desirable to substitute the more cheaply produced furnace process carbon blacks for the long established but recently increasingly expensive, easy processing channel blacks (known as EPC black) in rubber compounding by giving the furnace black some treatment that will modify one or more of its properties, or the properties of rubber containing the same, to make them more like those of channel black. Channel black is made by an old and relatively wasteful process of burning gas in gas burners in a shed in which accumulating combustion gases tend to make the combustion less complete, and allowing the resulting smoky flame to impinge on a relatively cool moving metal channel, from which the channel black is scraped. Channel black does especially well in natural rubber compounding, but because the price of gas is going up as metropolitan areas increase their demand for gas for heating, cooking, air conditioning, and illumination, substitutes for channel black are now in demand. Channel black has an acid pH below 7 and preferably below 6.

On the other hand, furnace black is made in a relatively new and efficient process by incomplete combustion and/or pyrolysis of hydrocarbon gas or preferably oil vapor, or sprayed oil in a turbulent mixture with hot combustion gases, or incomplete burning with air in a confined heat-insulated refractory furnace. Furnace black does especially well in synthetic rubbers, such as SBR (butadiene-styrene rubbers) and has an alkaline pH above 7 and preferably above 8.

Highly acidic blacks of the type produced by the present invention are also very suitable for compounding in butyl rubber, as well as in conventional elastomers.

I have found some novel and economical ways to treat or produce furnace black so that it will have an acid pH and be suitable as a substitute for easy processing (EPC) channel black, and this is one object of my invention.

Another object is to provide novel and useful processes for partially oxidizing carbon black, and novel apparatus for carrying out these processes.

Another object is to produce a substitute for channel black, and to produce processes and apparatus for making the same.

Numerous other objects and advantages will be obvious to those skilled in the art upon reading the accompanying specification, claims, and drawings.

In the drawings:

FIGURE 1 is an elevational view with parts in cross section, taken along the line 1—1 of FIGURE 2 looking in the direction indicated by the arrows of a conventional carbon black furnace showing one preferred embodiment of the present invention applied thereto.

FIGURE 2 is an end view of the furnace 11 of FIGURE 1 with parts in cross section taken along the line 2—2 thereof looking in the direction indicated.

FIGURE 3 is an elevational view of a conventional wet pelleting apparatus and pellet dryer showing a second preferred embodiment of the present invention.

The specific details of the preferred furnace, wet pelleting apparatus, and dryer are disclosed in U.S. Patent application Serial No. 230,197, filed October 12, 1962 now abandoned, by Naifeh and McNeil. However, the present invention is equally applicable to any furnace process of making carbon black known at present, or any wet or dry pelleting process for pelleting carbon black known at present.

In FIGURE 1 a carbon black furnace generally designated as 11 is provided with a plurality of alternative primary water quenches at 12 and 13 controlled by valves 14 and 16, respectively, in order to provide the desired length of time for the carbon black-forming reaction in furnace chambers 28 and 29, which form the carbon formation reaction zone in which carbon black is produced by the thermal decomposition of a hydrocarbon feedstock introduced axially from nozzle 21 preferably as a vapor or atomized spray of a liquid hydrocarbon oil 41. If desired, only one of quenches 12 and 13 is used as the primary quench to reduce the temperature from above 1100° C. to about 400° C., so that quench 33 is the secondary quench. The ammonium nitrate and water solution in 33B is added to quench 33 by means of pump 33A and it may also be added to quench 12 and/or 13, if desired. This ammonium nitrate solution in 33B may also contain the desired amount of ammonium halide, alkali metal halide, or alkaline earth metal halide, added from tank 25, or the halide could be added separately at an adjacent point (not shown) when such a halide is used.

While my invention applies to carbon black made without any alkaline metal additive upstream of the quench, some species of my invention can apply to carbon made as in Friauf et al., cited, in which alkail metal or alkali metal compounds are present in reaction zones 28, 29, preferably by being added to line 20 by pump 22 and line 18 from tank 17 and sprayed through nozzle 21 with the feedstock from tank 41.

As explained in Friauf et al., cited, it does not matter what alkali metal or alkali metal compound is used in practicing this invention, so long as the alkali metal has an atomic number of at least 19, because the compounds all decompose in the furnace, freeing the alkali metal. Potassium, rubidium, cesium and francium and their compounds all have the same effect in slightly varying degree. However, potassium is preferred as it is cheaper, and potassium chloride is most preferred. Potassium nitrate, potassium sulfate and potassium oleate are essentially the same in effect as potassium chloride, but are not preferred as the chlorine released from the chloride helps the carbon black-forming reaction, whereas the nitrate is an oxidizing agent and destroys some carbon black. One advantage of the potassium oleate is that it is oil soluble and can be added to tank 41 instead of at 18 if desired. The amounts of compound are immaterial as long as the alkali metal contained therein is 2 to 10,000 parts by weight of alkali metal per million parts by weight of the carbon black produced, as explained above.

A similar furnace that may be used is shown in Krejci U.S. Patent 3,009,784 of Nov. 21, 1961.

Furnace 11 may be made entirely of a ceramic material 23, such as sillimanite, alumina, or other suitable refractory, but in order to reduce the expense it is customary to surround refractory tube 23 with less expensive heat-insulating material 24, which can be any of those available on the market, and it is stronger construction to surround the furnace body with a steel shell 26, which can be made of any available, relatively inexpensive, carbon steel. Furnace 11 contains a cylindrical bore or chamber of varying diameter comprising, in axially connected series, annulus air chamber 27, enlarged precombustion chamber 28, reaction chamber 29, secondary quench chamber 31 and outlet conduit 30. It is possible to practice this invention in this furnace without chamber 27, if it is satisfactory to clean out the furnace frequently, and chamber 31 can be eliminated without changing the practice of the invention, except that control of the temperature of the solids-gas separation system, generally designated as 32, will become more difficult without variable amounts of secondary quench water added through secondary quench sprays 33.

As one species of my invention, I can add the ammonium nitrate as a water solution to secondary quench 33 by means of pump 33A from tank 33B. For example, enough of a dilute 0.5 to 5 weight percent ammonium nitrate aqueous solution can be added at quench 33 in sufficient quantity to provide 1 to 25 and more preferably from 5 to 10 weight percent, based on the carbon black being produced, of ammonium nitrate. As another species, this ammonium nitrate solution may not be added at 33 or the quenches 12 or 13, and instead may be added later at 67 by pump 70 from container 65. In either instance, this solution can also contain enough of a material selected from the group consisting of ammonium halides, alkali metal halides, and alkaline earth metal halides added from tank 25 to increase the degree of oxidation of said carbon black, preferably in amounts from 0.01 to 5 percent by weight and more preferably from 0.5 to 3 percent by weight of the carbon black produced.

As another species of my invention, the ammonuim nitrate, and also the halide if present, can be added as dry salts to carbon black hopper 62, as indicated by arrow 40, in equivalent amounts to give the same proportion of chemicals to the carbon black without water, which is of advantage when a dry pelleting system (not shown) is substituted for the wet pelleting system of FIGURE 3. In dry pelleting, the dryer 74 would both act as the dry pelleter and would supply the heat necessary to react the carbon black and ammonium nitrate, inlet line 76 being directly connected to valve 63 and the wet pelletizer 66 omitted (not shown).

Samples of carbon black, the photelometer value of which may be measured as explained above, can be taken by placing a gas-permeable, carbon black-impermeable, cloth filter bag 35 over the end of outlet 34 and then opening valve 36 until a sample is collected in the bag, some gas escaping to the atmosphere through the filter bag during the sampling process. While a simple bag filter separator is shown as the off-gas, carbon black separation system 32, with inlet 30, an upper axial outlet 37 for off-gas, a lower axial outlet 38 controlled by rotating star valve 39 for carbon black, and a screen or filter bag 40 between inlet 30 and gas outlet 37, obviously any of the many other solids separation systems employed in the prior carbon black art may be substituted without departing from the present invention. For example, one or more cyclone separators (not shown) can be substituted for 32 or added in line 30 with their solids outlet connected to 38, as discussed in said Krejci patent relative to his part 24. The pressure drop, $\Delta P$, across the filter bag 40 may be measured by measuring the pressure on opposite sides thereof by the two pressure gauges 45 and 50.

For purposes of illustration, a hydrocarbon oil from tank 41 is being used as the axial feedstock introduced into the furnace through nozzle 21, being pumped through line 42 and valve 43 by pump 44. This oil can be sprayed into the furnace in liquid form or can be preheated in heater 46, heated by any available fuel 47, such as gas, or other source of heat (such as an electric heater, not shown), as only indirect heat exchange occurs in the heater. The preheating may vaporize as much as 80 to 100 percent of the oil in pipe 42, or in pipe 20 after it passes through valve 43. In such pumping systems it is generally desired, but not absolutely necessary, to have a safety pressure relief line 48 with a pressure relief valve 49. Valve 43 and relief valve 49 also help pump 23 to meter controlled amounts of the additive 17 into the feedstock in pipe 20.

It should be understood that instead of hydrocarbon oil from tank 41, other carbonaceous fluid, either liquids, vaporized liquids or gases, may be employed as the feedstock in line 20, such as methane, ethane, propane, gasoline, kerosene, gas oil, fuel oil, or other hydrocarbons. While the quality and yield of carbon black produced will vary with the BMCI (United States Bureau of Mines Correlation Index) of the feedstock chosen, the present invention will produce the same type of changes in varying degree with any carbonaceous feedstock chosen.

In order to reduce or eliminate carbonaceous deposits on nozzle 21, it has been found desirable to inject a minor amount of gas around it through annulus 27, known as annulus gas, or air. Air, natural gas, methane, hydrogen, steam, nitrogen, or other inert oxidizing or reducing gases have been suggested for this purpose in the prior art, and all can be used in this invention. It is preferred to use air alone, or air and methane, from supplies 51 and 52 controlled by valves 53 and 54.

In order to supply additional heat to the furnace, it is preferred to introduce a fluid fuel, preferably natural gas, coal gas or water gas, whichever is cheapest and available, through pipes 56 along with any suitable free oxygen-containing gas, preferably air, through pipes 57 tangentially into the precombustion zone 28 through tangential tunnels 58, as shown best in FIGURE 2. There are numerous tangential burners in the prior art which can be used instead of the specific preferred burners 56 and 57. Shield 59 is helpful in providing better mixing of gas from radial holes in pipe 56 (the end of which is preferably closed) with air from pipe 57, but is not essential.

A liquid or vaporized oil can be substituted for the fuel gas in pipe 56. Fuel 56 can be the same as feedstock 41, but this is unusual, as generally a cheaper fuel is available of lower BMCI than the feedstock, which is more economical to use. Generally, a large part of the carbon in fuel 56 is burned up to heat feedstock 41, which is largely converted to carbon black, but some of the carbon black produced probably comes from the fuel, depending on combustion conditions and interchange of atoms during the reaction. This invention does not depend on this question of whether some of the carbon in the carbon black comes from fuel 56 or all comes from feedstock 41.

While there is always a small market for some flocculent carbon black produced in line 38 of FIGURE 1, the major portion is generally pelleted in order to reduce the amount of dust generated in handling the carbon black product, mixing it with rubber in automobile tire plants, or use in other processes.

Suitable wet pelleting apparatus is shown diagrammatically in FIGURE 3. Any such known system, as shown in U.S. Patents to Marsh, 3,017,662 of January 23, 1962; King, 2,949,349 of August 16, 1960; or Wood et al., 2,952,921 of September 20, 1960, may be employed in this invention. Some of the carbon black from line 38 passes through line 38A into carbon black storage tank 62 from which it is fed in controlled amounts through star valve 63 driven by motor 64 into wet pelletizer 66 into which pelletizing liquid 67 is sprayed in amounts controlled by valve 68. While cold water can be employed, a dilute sugar or molasses solution is preferred, and it is preferred to heat the same in heater 69. The mixing is preferably aided by helically disposed radial pins 71 on shaft 72 driven by motor 73.

The resulting wet pellets can be taken directly to a dryer 74 through line 76 and valve 77, or valve 77 can be closed and valve 78 opened and the pellets weighed on weigh belt 79 and polished in one or more polishing drums 81, 82 and/or 83 on its way to said dryer 74 by opening the corresponding valve 78A or 78B and closing valve 77A or 77B. The dryer may be heated by gas from 84 and the dried pellets product conveyed through conveyor 86 to shipment or storage, all as explained in said wet pelleting patents.

In dryer 74, the gas from 84 preferably burns in burners 87 with air from inlet 90 in the annulus between the dryer body 74 and rotating drum 88, then passes as purge gas through pipe 89, axially through rotating drum 88 above the bed of carbon black pellets therein, and out flue 91 into a bag filter 92 (similar to bag filter 32) where the purge gas and water vapor escape to the atmosphere at 93 and the carbon black fines are removed as solids through pipe 94. Bag filters 32 and 92 are shown schematically, as a plurality of elongated bags can be employed as known in the prior art (not shown). The temperature is controlled by temperature recorder-controller 85 controlling the gas in line 84 going to the downstream burner 87.

While the preferred halide in tank 25 is dry sodium chloride, or aqueous solutions thereof, added in the amounts specified above, all the other ammonium, alkali metal, and alkaline earth metal halides give valuable results in the present invention when used in the amounts claimed, for example, lithium fluoride, chloride, bromide or iodide, sodium fluoride, chloride, bromide or iodide, and potassium fluoride, chloride, bromide or iodide. The similar rubidium, caesium and francium compounds will be effective but are too expensive to use commercially. Calcium fluoride, chloride, bromide and iodide, strontium fluoride, chloride, bromide and iodide, and barium fluoride, chloride, bromide and iodide can be used as the alkaline earth metal salts, with varying advantages in the practice of this invention. It should be understood that the use of a halide of an alkali metal in tank 25 added to the system in quench 33 or in pelletizing liquid 67 is different in its action than the alkali metal halide, potassium chloride, added to the reaction zones 28, 29, from tank 17. As Friauf et al., cited, states in column 7, lines 34–36, when an alkali metal chloride is added in the quench immediately following the carbon-forming reaction zone, their effect to produce the changes in modulus desired by Friauf et al., is substantially nil. In contrast, in the present invention the halide increases the degree of oxidation of the carbon black and reduces the pH when the carbon black is heated with ammonium nitrate, regardless of whether the halide is added to tank 33B, tank 65 or tank 17, whereas the pH of the carbon black produced is substantially unchanged by adding the alkali metal halide to the reaction zones 28 and 29 in the absence of any treatment with ammonium nitrate.

The invention may be further illustrated by the following examples:

*Example I*

A 100 g. quantity of high abrasion furnace black (Philblack-O) of pH 9.1 was slurried with 200 ml. distilled water and 10 g. ammonium nitrate. The mixture was dried on a hot plate in a porcelain dish for 1 hour at a temperature of about 200° C. The pH of the carbon black (ASTM D–1512) was found to be 3.8. Washing the black with 100 ml. of boiled distilled water only changed the pH of the black to 4.4. A 1–5 weight percent solution of ammonium nitrate in water was found to exhibit a pH of 5.3, while the untreated black had a pH of about 9. The data indicate, therefore, that the acidity results from oxidation of the surface of the black with the formation of acidic sites.

*Example II*

A 200 g. quantity of high abrasion furnace black (Philblack-O) of pH 9.1 was blended with 300 ml. water containing 20 g. ammonium nitrate. It was dried by heating for 3 hours in an oven at about 155° C. After cooling the black exhibited a pH of 3.3 (ASTM D–1512). The black was washed with ten 10-ml. portions of boiled distilled water and the pH was still found to be only 4.1. The elemental analysis of the black was determined before and after treatment as follows:

| Element | Before Treatment | After Treatment |
|---|---|---|
| Percent (by weight): | | |
| C | 97.52 | 96.54 |
| H | 0.51 | 0.50 |
| N | 0.30 | 0.29 |
| O | 0.80 | 1.81 |
| S | 0.87 | 0.86 |
| | 100.00 | 100.00 |

The significant effect of the treatment was the substantial increase in oxygen content which was about 0.8 before treatment.

The treated black was evaluated in a natural rubber tread stock formulation, Recipe #1, and the results may be seen in Table I. For comparison, similar data are also given for a commercial easy-processing channel black (Wyex) and a high abrasion furnace black which had not been ammonium nitrate treated. (The latter is shown at two accelerator levels.) This high abrasion furnace black is known as IRB #1.

RECIPE #1

| | |
|---|---|
| #1 Smoked sheet | 100 |
| Black | 45 |
| Zinc oxide | 3 |
| Stearic acid | 3 |
| Flexamine | 1 |
| Flexzone 3C | 2 |
| Philrich 5 | 5 |
| Vultrol | 1 |
| Sulfur | 2.25 |
| NOBS special | [1] 0.7 |

[1] 0.5 phr. also used for IRB #1.

TABLE I.—PHILBLACK-O TREATED WITH AMMONIUM NITRATE

| | N | O | P | R |
|---|---|---|---|---|
| Black | Invention | Wyex | IRB #1 | IRB #1 |
| After-treated with | $NH_4NO_3$ | | | |
| Treating Temp., °C | 155 | | | |
| Oxygen, percent | 1.8 | | | |
| pH | 3.3 | 4.0 | 9.2 | 9.2 |
| NOBS Special, phr | 0.7 | 0.7 | 0.7 | 0.5 |
| Compounded MS-1½ at 212° F | 28.0 | 29.0 | 27.7 | 30.0 |
| Min. to Scorch at 280° F., 5 Pt. Rise | 11.1 | 10.0 | 6.5 | 7.6 |
| Extrusion at 195° F.: | | | | |
| in./min | 49.0 | 43.0 | 47.5 | 49.0 |
| g./min | 102.0 | 94.0 | 100.5 | 103.0 |
| Rating | 11 | 11− | 11+ | |

TABLE I—Continued. Physical Properties (45 min. cure at 293° F.)

| | | | | |
|---|---|---|---|---|
| Cross-link Density, $\nu \times 10^4$, moles/cc | 1.65 | 1.64 | 1.82 | 1.65 |
| Compression Set, Percent | 18.1 | 18.2 | 13.7 | 15.4 |
| 300% Modulus, p.s.i | 1,520 | 1,320 | 1,875 | 1,690 |
| Tensile Strength, p.s.i | a 3,840 | 4,380 | 4,125 | 4,200 |
| Elongation, percent | 575 | 625 | 545 | 580 |
| Tensile at 200° F., p.s.i | 2,345 | 2,520 | 2,650 | 2,630 |
| Tear Strength, lbs./in. at— | | | | |
| 80° F., avg. of all cures | 640 | 710 | 665 | 695 |
| 200° F., avg. of all cures | 270 | 270 | 250 | 285 |
| 300° F., avg. of all cures | 220 | 145 | 200 | 190 |
| $\Delta T$, °F | 38.8 | 37.6 | 35.8 | 36.5 |
| Resilience, percent | 69.1 | 69.1 | 73.7 | 71.9 |
| Shore A Hardness | 62.5 | 60.0 | 63.5 | 62.5 |
| Oven Aged 24 Hours at 212° F.: | | | | |
| 300% Modulus, p.s.i | 2,050 | 2,000 | 2,280 | 2,000 |
| Tensile, p.s.i | 3,205 | 3,580 | 2,975 | 2,700 |
| Elongation, percent | 450 | 470 | 380 | 380 |
| $\Delta T$, °F.[b] | 36.5 | 35.1 | 35.7 | 35.0 |
| Resilience, percent[b] | 76.4 | 76.8 | 75.9 | 75.3 |
| Abrasion Loss, g | 14.64 | 13.94 | 12.35 | 12.56 | a Tensile values on samples cured 20 and 30 minutes were within approximately 100–150 p.s.i. of IRB.
b On 30 minute cures.

As is seen from the data, the treatment with ammonium nitrate gave reductions in cross-linking, modulus, and resilience and gave an increase in time to scorch. With the exception of higher modulus and lower tensile, properties imparted to natural rubber by the treated black were similar to those given by the channel black (Wyex).

Example III

A 200 g. quantity of high abrasion furnace black (Philblack-O) of pH 9.1 which had been made with a feed containing 125 p.p.m. KCl oil additive to give low structure black (oil absorption of 0.96 by soft ball method) was blended with 200 ml. water containing 20 g. of ammonium nitrate. The mixture was then placed in an oven at 155–165° C. for 2 hours. After cooling, the pH of the treated carbon black was found to be 3.30 pH when tested in an aqueous slurry by ASTM D–1512.

This carbon black treating was repeated in another run essentially identical to the above except that the treated black was dried at 200° C. These two treated blacks were evaluated in a rubber formulation using the same recipe shown in Example II, and the results may be seen in Table II. A control run showing the same non-treated black is included as well as data on a commercial easy-processing channel black (Wyex) and a typical high abrasion furnace black (IRB #1) for comparison purposes.

TABLE II.—LOW STRUCTURE PHILBLACK-O TYPE BLACK TREATED WITH AMMONIUM NITRATE

| | A | B | C | D | E |
|---|---|---|---|---|---|
| Black | Invention | Invention | Wyex | IRB #1 | Control |
| After-treated with | $NH_4NO_3$ | $NH_4NO_3$ | | | |
| Drying Temperature, °C | 165 | 200 | | | |
| pH | 3.3 | 3.3 | 4.0 | 9.2 | |
| Nitrogen Surface Area | | | 114 | 80 | 85 |
| Oxygen Analysis, Percent | 2.03 | | | | 0.8 |
| Compounded MS-1½ at 212° F | 29.0 | 29.2 | 30.9 | 31.0 | 31.5 |
| Scorch at 280° F., Min. to 5 Pt. Rise | 10.6 | 11.0 | 10.7 | 8.0 | 9.2 |
| Extrusion at 195° F.: | | | | | |
| in./min | 44.0 | 44.5 | 43.0 | 47.0 | 41.0 |
| g./min | 99.0 | 99.5 | 94.0 | 100.0 | 98 |
| Rating | 10+ | 11− | 10+ | 11− | 11 |

TABLE II—Continued. Physical Properties (45 min. cure at 293° F.)

| | | | | | |
|---|---|---|---|---|---|
| Cross-link Density, $\nu \times 10^4$, moles/cc. | 1.54 | 1.56 | 1.60 | 1.65 | 1.70 |
| Compression Set, percent | 15.4 | 15.6 | 15.5 | 13.2 | 13.8 |
| 300% Modulus, p.s.i. | 1,150 | 1,190 | 1,215 | 1,680 | 1,435 |
| Tensile Strength, p.s.i. | 4,125 | 4,180 | 4,350 | 4,280 | 4,200 |
| Elongation, percent | 635 | 630 | 645 | 575 | 595 |
| Tensile at 200° F., p.s.i. | 2,430 | 2,480 | 2,480 | 2,550 | |
| Tear Strength, lbs./in. at— | | | | | |
|   80° F., avg. of all cures | 690 | 650 | 730 | 700 | 660 |
|   200° F., avg. of all cures | 315 | 250 | 300 | 275 | 300 |
|   300° F., avg. of all cures | 195 | 200 | 170 | 225 | |
| $\Delta T$, ° F. | 38.4 | 36.2 | 36.9 | 38.9 | 34.4 |
| Resilience, percent | 72.0 | 74.8 | 72.4 | 70.8 | 75.0 |
| Shore A Hardness | 62.0 | 62.5 | 62.0 | 64.5 | 62.0 |
| Oven Aged 24 Hrs. at 212° F.: | | | | | |
|   300% Modulus, p.s.i. | 1,725 | 1,890 | 1,965 | 2,075 | 1,970 |
|   Tensile, p.s.i. | 3,390 | 3,240 | 3,270 | 2,750 | 3,470 |
|   Elongation, percent | 500 | 455 | 445 | 370 | 450 |
|   $\Delta T$, ° F.[a] | 34.1 | 35.4 | 34.7 | 34.7 | 33.1 |
|   Resilience, Percent[a] | 76.1 | 76.6 | 76.2 | 76.9 | 79.1 |
|   Abrasion Loss, g. | 16.83 | 16.73 | 15.84 | 12.20 | 14.58 |
|   Abrasion Index | 72 | 73 | 77 | 100 | |

[a] On 30-minute cures.

The rubber properties show that the treatment with ammonium nitrate effected a reduction in modulus, cross-linking, and tensile strength. Hysteresis was increased. The treated blacks were near equal to Wyex in most of the rubber properties in this evaluation. The sample dried at 200° C. is slightly closer to Wyex in modulus than the sample dried at 165° C.

The results of this investigation indicate that low structure black made from oil containing 125 p.p.m. KCl and treated with 10 weight percent ammonium nitrate, based on the black, imparts rubber properties similar to those of channel black (Wyex) when compounded in a natural rubber tread recipe.

*Example IV*

In a manner similar to that of the preceding examples, a KCl-modified intermediate super abrasion furnace black (Philblack-I) of pH 9.3 was treated with 10 percent by weight, based on the black, of ammonium nitrate and dried at 185–190° C. Analysis showed that the treated black had an oxygen content of 1.90 weight percent compared to 0.90 percent for the untreated material.

*Example V*

The treatment of a KCl-modified intermediate super abrasion furnace black of pH 9.3 was repeated in a manner similar to Example IV except that the treatment comprised 20 weight percent ammonium nitrate and the drying was carried out at about 350° C. In addition, about 1 percent of sodium chloride, based on the weight of the black, was used in the treatment. The oxygen content of the treated black was found to be 1.7 weight percent compared to 1.4 weight percent for a control run which was a duplicate except that the sodium chloride was not included. These data indicate that the presence of chloride ion influences the decomposition of the ammonium nitrate in a manner which improves treatment of the black.

*Example VI*

The same carbon black (Philblack-O) of pH 9.1 described in Example III was pelleted and 25 pounds of these pellets were charged into a rotatable 55-gallon drum. While the drum was rotating, 16.7 pounds of aqueous ammonium nitrate solution (containing 2.25 pounds uncoated fertilizer grade ammonium nitrate) was sprayed onto the pellets in about 50 minutes by means of a spray head inserted into one end of the drum.

The ammonium nitrate-impregnated pellets were then transferred to a gas-fired 36 x 20 inch cylindrical pellet dryer. A flow of nitrogen purging gas was allowed to continuously pass through the dryer and the dryer was heated to about 265° F. in about 3 hours. At this point the temperature rose rapidly to about 350° F. in about 1 minute. After this rapid temperature rise the pellets were then degassed by heating at 425° F. for 30 minutes after which the drum was allowed to cool down to about 100–150° F. The nitrogen purge was then stopped and the pellets were unloaded.

The above-described ammonium nitrate-treated black was evaluated in rubber using the same recipe shown in Example III and Table II. The evaluation results are seen in Table III. For comparison purposes the results of the untreated carbon black are also included.

The treated and untreated blacks were also tested for tear strength in the natural rubber recipe described previously. After conventional mixing and curing at 293° F. for 30 minutes, the rubbers were tested by the method of Rivlin and Thomas, Journal of Polymer Science, 10, 291–318 (1953), using the "simple extension tear" test piece option. The testing was carried out at room temperature and at 90° C., and at 0.1, 1.0 and 10 in./min. separation speeds. For further comparison, a sample of a conventional EPC black (Wyex) was also tested. All the tear results representing the effect of each black were averaged. To simplify comparison these averaged results were arbitrarily normalized to give a value of 100 to the reference EPC black. The resulting adjusted tear values thus gave comparative ratings as follows:

| Black: | Tear rating |
|---|---|
| Untreated furnace black | 75 |
| Ammonium nitrate-treated furnace black | 118 |
| Commercial channel black | 100 |

As may be seen from the ratings, the ammonium nitrate-treated black offers outstanding tear properties when compared to the untreated black. The resistance to tear also surpasses that of the EPC black.

TABLE III.—AMMONIUM NITRATE TREATMENT OF PELLETED BLACK

| Black | Invention | Control |
|---|---|---|
| After-treated With (9 wt. percent) | $NH_4NO_3$ | |
| Drying Temp., ° F | 425 | |
| pH | 3.3 | 7.0 |
| Volatiles, percent | 2.20 | 1.63 |
| Surface Area, m.²/g | 80 | 77 |
| H, percent | 0.26 | 0.20 |
| O, percent | 1.3 | 0.8 |
| Total Acids, microequivalents/g | 608 | 324 |
| Strong Acid, microequivalents/g | 50 | 0 |
| DPG Adsorption, microequivalents/g | 55.2 | 15.3 |
| Processing Properties: | | |
|   Compounded MS-1½ at 212° F | 28.0 | 27.3 |
|   Scorch at 250° F., min | 35.6 | 29.7 |
|   Scorch at 280° F., min | 12.3 | 10.2 |
|   Extrusion at 195° F.: | | |
|     in./min | 40.4 | 41.0 |
|     g./min | 99.0 | 100.0 |
|     Rating | 11– | 11 |
| Physical Properties (30 Min. Cure at 293° F.): | | |
|   Cross-linking, $\nu \times 10^4$, moles/cc | 1.64 | 1.83 |
|   Compression Set, percent | 27.3 | 21.1 |
|   300% Modulus, p.s.i. | 1,190 | 1,430 |
|   Tensile, p.s.i. | 4,320 | 4,160 |
|   Elongation, percent | 645 | 585 |
|   Max. Tensile at 200° F | 2,675 | 2,730 |
|   $\Delta T$, ° F | 31.0 | 34.4 |
|   Resilience, percent | 74.9 | 73.1 |
|   Shore A Hardness | 59.5 | 61.0 |

While only certain examples have been chosen for presentation and only certain preferred modifications of the invention have been described, for purposes of illustrating the invention in a succinct manner as required by law, it is obvious that the present invention is not limited thereto, but has greater scope as set forth in the objects and advantages of the specification and claims. This invention may be practiced with a conventional fluidized bed (not shown) in place of the dryer 74. Heated air can be used as the fluidizing gas (not shown) or in place of the combustion gas from the combustion of fuel gas 84 and air 90. When the heat of combustion in furnace 29 is employed with the ammonium nitrate in quench 33, then the shorter reaction times between 0.01 and 1 minute are more desirable, but any time that allows for oxidation is sufficient.

Having described my invention, I claim:

1. The process of reducing the pH of a furnace carbon black having an alkaline pH above 7 to an acid pH below 7 by mixing the original carbon black with a minor proportion of from 1 to 25 weight percent based on the carbon black of ammonium nitrate and heating the mixture to about 155 to 400° C. for a period of time of 0.01 minute to 24 hours sufficient to cause the partial oxidation of said carbon black.

2. The process of reducing the pH of a furnace carbon black having an alkaline pH above 7 to an acid pH below 7 by mixing the original carbon black with a minor proportion of from 5 to 10 weight percent based on the carbon black of ammonium nitrate and heating the mixture to about 175 to 250° C. for a period of time of ½ to 6 hours sufficient to cause the partial oxidation of said carbon black.

3. The process of reducing the pH of a furnace carbon black having an alkaline pH above 8 to an acid pH below 6 by mixing the original carbon black with a minor proportion based on the carbon black of ammonium nitrate and heating the mixture to about 155 to 400° C. for a period of time sufficient to cause the decomposition and volatilization of the ammonium nitrate and the partial oxidation of said carbon black.

4. The process of claim 1 in which the carbon black is also mixed before the heating step with a small amount effective to increase the degree of oxidation of said carbon black in said heating step of a substance selected from the group consisting of ammonium halides, alkali metal halides, and alkaline earth metal halides in amounts from 0.01 to 5 percent by weight based on the weight of the carbon black.

5. The process of claim 2 in which the carbon black is also mixed before the heating step with a small amount effective to increase the degree of oxidation of said carbon black in said heating step of a substance selected from the group consisting of ammonium halides, alkali metal halides, and alkaline earth metal halides in amounts from 0.5 to 3 percent by weight based on the weight of the carbon black.

6. The process of claim 3 in which the carbon black is also mixed before the heating step with a small amount effective to increase the degree of oxidation of said carbon black in said heating step of a substance selected from the group consisting of ammonium halides, alkali metal halides, and alkaline earth metal halides.

7. The process of claim 1 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

8. The process of claim 2 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

9. The process of claim 3 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

10. The process of claim 4 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

11. The process of claim 5 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

12. The process of claim 6 in which the carbon black to be treated is produced by thermal decomposition of a hydrocarbon in a carbon formation reaction zone in a furnace while conditions of free carbon formation are maintained therein and simultaneously an alkali metal of atomic number of at least 19 is present in said zone in an amount between 2 and 10,000 parts by weight of alkali metal per million parts by weight of carbon black produced.

13. The process of claim 6 in which the halide is sodium chloride.

14. The process of claim 12 in which the halide is sodium chloride and the alkali metal of atomic number of at least 19 is potassium.

References Cited by the Examiner

UNITED STATES PATENTS

| | | | |
|---|---|---|---|
| 2,641,533 | 6/1953 | Cines et al. | 23—209.1 |
| 2,682,448 | 6/1954 | Cines | 23—209.1 |
| 2,686,107 | 8/1954 | Jordan | 23—209.1 |
| 3,010,794 | 11/1961 | Friauf et. al. | 23—209.4 |

OSCAR R. VERTIZ, *Primary Examiner.*

E. J. MEROS, *Assistant Examiner.*